UNITED STATES PATENT OFFICE.

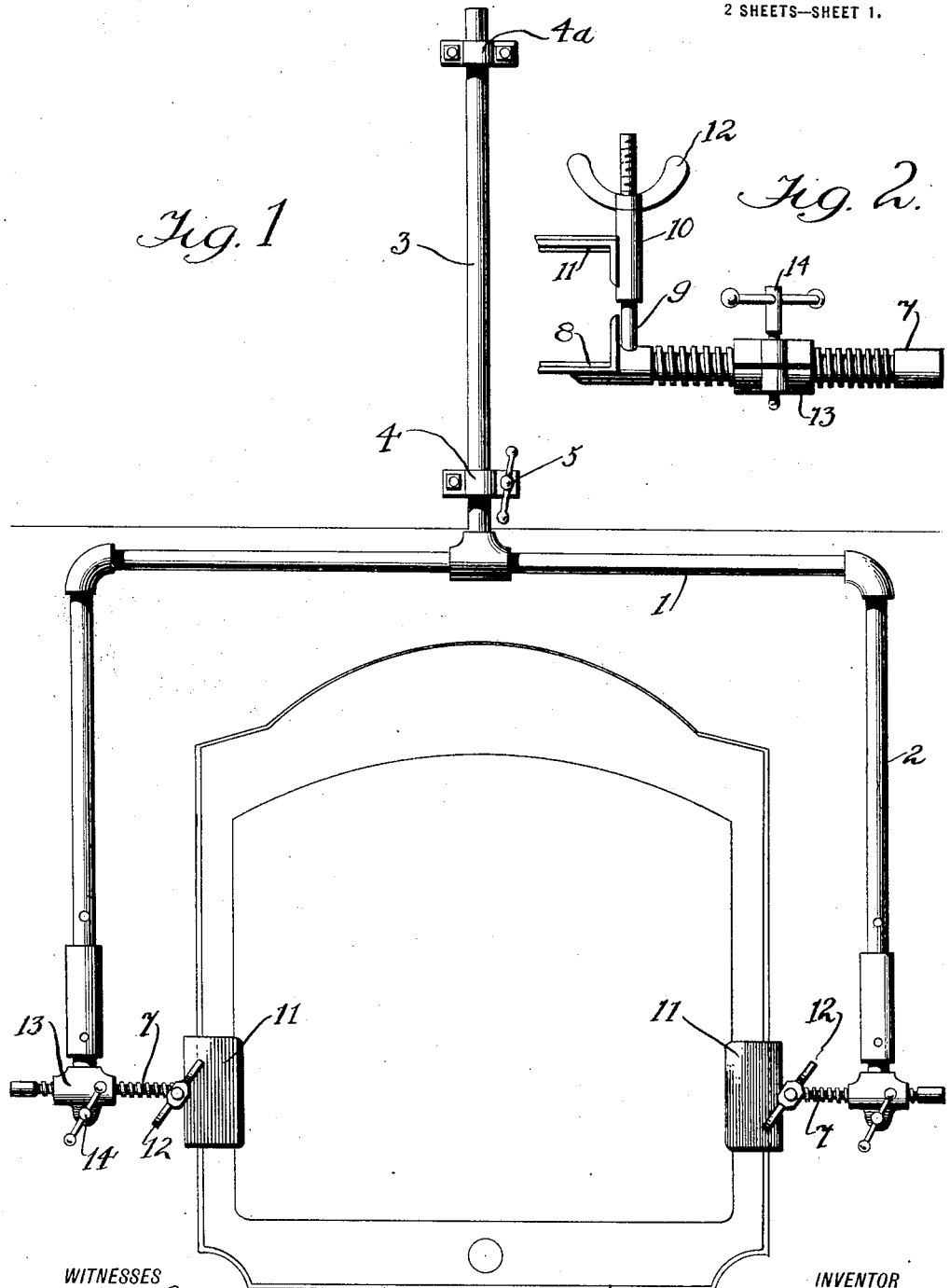

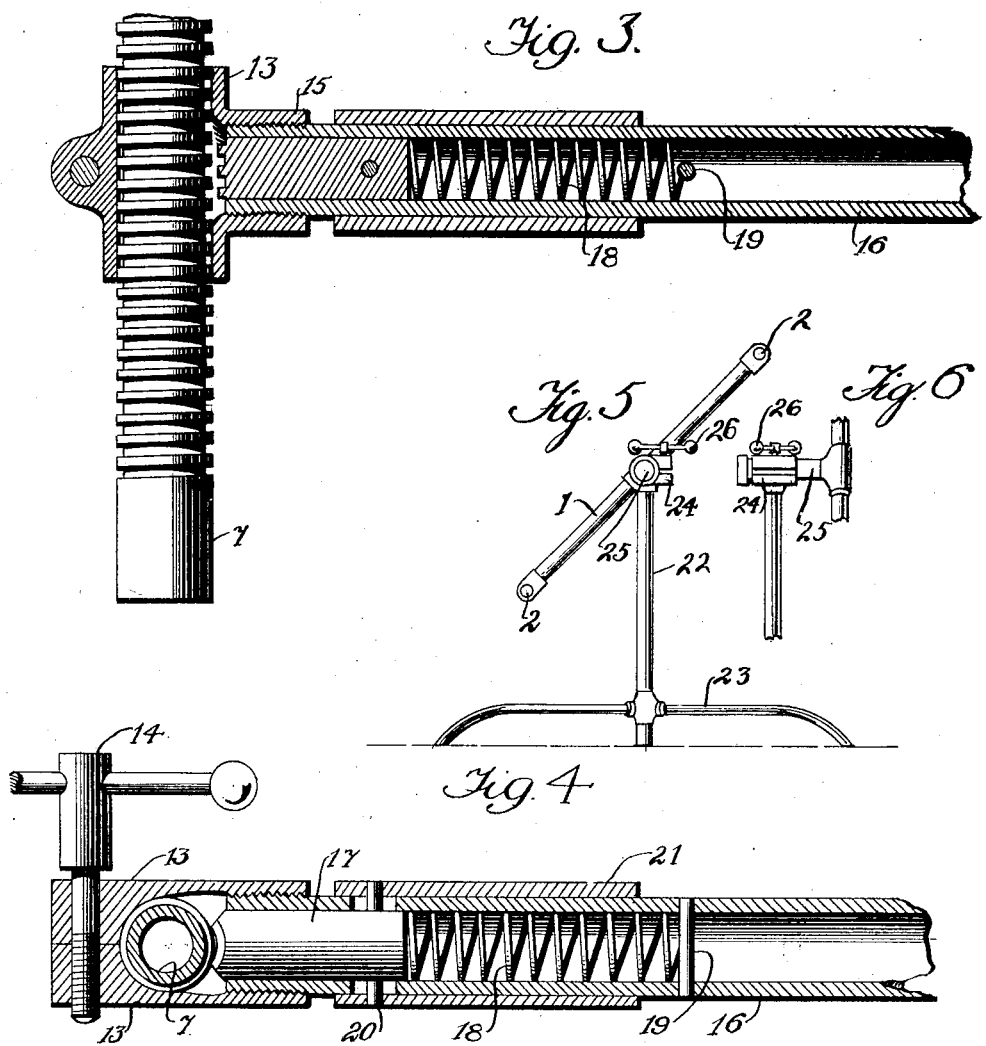

AUGUST L. W. OHMACHT, OF CRESCO, IOWA.

RADIATOR-SUPPORT.

1,344,559. Specification of Letters Patent. Patented June 22, 1920.

Application filed October 2, 1919. Serial No. 328,002.

*To all whom it may concern:*

Be it known that I, AUGUST L. W. OHMACHT, a citizen of the United States, and a resident of Cresco, in the county of Howard and State of Iowa, have invented certain new and useful Improvements in Radiator-Supports, of which the following is a specification.

My invention is an improvement in radiator supports, and has for its object to provide a support of the character specified for supporting radiators to be soldered or otherwise repaired in various positions, so that any part of the radiator may be brought into a position accessible for soldering, and such that the hot solder will run into the desired place by gravity.

In the accompanying drawings forming a part of this specification, I show one form of my invention, but it should be understood that I do not limit myself to the precise mechanism shown, for the reason that various changes may be made therein without departing from the spirit of my invention.

In the drawings:

Figure 1 is a top plan view of the improved support arranged in horizontal position;

Fig. 2 is an enlarged detail of one of the clamping members for the radiator, looking in the opposite direction from Fig. 1;

Fig. 3 is a horizontal section through the releasing mechanism for the clamp holding rods;

Fig. 4 is a similar view at right angles to Fig. 3;

Fig. 5 is a front view of a modified construction;

Fig. 6 is a view at right angles to Fig. 5 of the clamp.

In the present embodiment of the invention, the improved support consists of a substantially U-shaped member composed of a body 1 and arms 2, the body having connected with the center thereof a shaft 3, which may be mounted in suitable bearings 4 and 4ª upon a work bench or other support.

One of these bearings, the bearing 4 in the present instance, is so arranged that it may be clamped upon the shaft 3 to prevent rotation thereof and to hold the radiator in adjusted position. The bearing 4 is a sectional bearing, and in the bearing the ends of the sections are connected by a handled screw 5, which may be turned to tighten the bearing sections upon the shaft or to loosen said sections, as may be desired.

It will be understood that the shaft 3 might be mounted in vertical position if desired, or the yoke or U-shaped member 1—2 might be connected with a portable support, which would permit the mechanism to be moved from place to place. Each arm 2 is connected with mechanism for gripping the radiator indicated at 6, the said mechanism being designed to engage and clamp the opposite sides of the radiator, as shown.

A rod 7 provided with annular rings is connected with the free end of each arm 2 in a manner to be presently described, and each of these rods has at each end a head. An L-shaped clamping member 8 is connected with one of the heads, and this head has a lateral stem 9 over which is mounted to slide a sleeve 10 carrying the other L-shaped clamping member 11 which coöperates with the member 8 to grip the radiator. The outer end of the stem 9 is threaded and is engaged by a wing nut 12, by means of which the clamping member 11 may be moved toward the member 8. The mechanism for connecting the rod 7 to the arm 2 consists of a pair of similar clamping sections 13, which are recessed upon their abutting faces to receive the rod 7.

The sections are clamped together by means of a handled screw 14, which has threaded engagement with one section and rotatable engagement with the other, as shown in Fig. 4. The sections 13 have lateral nipple sections 15, into which is threaded one end of a tubular casing 16. Within this casing is mounted to slide a bolt 17 having that end adjacent to the rod 7 provided with threads for engaging the rings thereof, to hold the rod, and this bolt is normally pressed toward the rod 7 by means of a coil spring 18, the said spring being arranged between the bolt and a cross pin 19 in the tubular casing. The bolt is provided with a cross pin 20, which extends through longitudinally extending slots in the tubular casing 16 and engage openings in a sleeve 21 mounted to slide on the tubular section toward and from the rod 7. With this construction, by grasping the sleeve 21 and moving it away from the rod 7, the bolt 17 will be moved out of engagement with the rod, thus releasing the rod from the clamping sections 13 and permitting it to move freely in the said sections.

In operation, the radiator 6 to be worked upon is clamped between the clamping sections 8 and 11 at each side, the said sections being clamped upon the radiator by means of the wing nut 12. In order to approach the sections 8—11 to the radiator, the bolt 17 is released, after which the sections may be moved into engagement with the radiator. The screw may be clamped to the clamping sections 13 by means of the handled screw 14, and the frame 1—2 of the support may be turned in the bearings 4 and 4ª to bring any part of the radiator into accessible position. With the shaft 3 in horizontal position, either face or either end of the radiator might be brought upward. By turning the rod 7 either end of the radiator or either face may be made accessible.

In Fig. 5 is shown a stand consisting of an upright or standard 22 and outwardly extending bracing legs 23 at its bottom. The stand carries a sectional bearing 24 at its top similar to the bearing 13, and this bearing is clamped upon the shaft 25 corresponding to the shaft 3 of Fig. 1, by means of a handled nut 26. This shaft 25 is short, and has a head at the end remote from the body 1 of the yoke. With this arrangement, the radiator support may be moved from place to place, and in either arrangement the radiator faces may be brought into inclined position to make them more accessible or to bring the light in better position upon them.

I claim:

1. A support for holding radiators during repair, comprising a yoke consisting of a body and arms, each arm having a split bearing at its end, a rod passing through each bearing, means for clamping the bearing on the rod, and releasable means in connection with the arm for engaging the rod to hold the rod from movement longitudinally as it is rotated, each rod carrying a clamp at its inner end for engaging the radiator, each clamp consisting of similar angle plates for engaging the front and rear faces of the radiator, and means for clamping the plates on the radiator.

2. A support for holding radiators during repair, comprising a yoke consisting of a body and arms, each arm having a split bearing at its ends, a rod passing through each bearing, means for clamping the bearing on the rod, releasable means in connection with the arm for engaging the rod to hold the same from movement longitudinally as it is rotated, each rod carrying a clamp at its inner end for engaging the radiator, and means connected with the body of the yoke for supporting the same to rotate on an axis parallel with the arm, said means comprising a fixed split bearing, a shaft extending laterally from the yoke body and journaled in the bearing, and means for clamping the bearing on the shaft.

3. A support for holding radiators during repair, comprising a yoke consisting of a body and arms, each arm having a split bearing at its end, a rod passing through each bearing, means for clamping the bearing on the rod, releasable means in connection with the arm for engaging the rod to hold it from movement longitudinally as it is rotated, each rod carrying a clamp at its inner end for engaging the radiator, and means connected with the body of the yoke for supporting the same to rotate on an axis parallel with the arm.

4. A radiator support of the character specified comprising a yoke consisting of a body and arms, each arm having means in connection therewith and adjustable transversely of the arm for clamping the edge of the radiator, means connected with the body of the yoke for supporting the same to rotate on an axis parallel with the arms, said clamp carrying means comprising rods, each arm having a bearing through which the rod is movable, means for clamping each bearing on the rod, and releasable means in connection with the arm for holding the rod from movement longitudinally as it is rotated.

5. A radiator support of the character specified comprising a yoke consisting of a body and arms, each arm having means in connection therewith and adjustable transversely of the arm for clamping the edge of the radiator, means connected with the body of the yoke for supporting the same to rotate on an axis parallel with the arms, said clamp carrying means comprising rods, each arm having a bearing through which the rod is movable, and means for clamping each bearing on the rod.

6. A radiator support of the character specified comprising a yoke consisting of a body and arms, each arm having means in connection therewith and adjustable transversely of the arm for clamping the edge of the radiator, and means connected with the body of the yoke for supporting the same to rotate on an axis parallel with the arms.

7. A radiator support comprising a yoke composed of a body and arms, the arms having means for grasping the opposite sides of the radiator, and means for supporting the yoke to rotate on an axis parallel with the arms, said grasping means being in alinement and being rotatably connected with the arms to rotate the radiator on an axis parallel with the body of the yoke.

AUGUST L. W. OHMACHT.